(12) United States Patent
Kommula

(10) Patent No.: US 7,676,576 B1
(45) Date of Patent: Mar. 9, 2010

(54) METHOD AND SYSTEM TO CLEAR COUNTERS USED FOR STATISTICAL TRACKING FOR GLOBAL SERVER LOAD BALANCING

(75) Inventor: Sunanda L. Kommula, San Jose, CA (US)

(73) Assignee: Foundry Networks, Inc., Santa Clara, CA (US)

( * ) Notice: Subject to any disclaimer, the term of this patent is extended or adjusted under 35 U.S.C. 154(b) by 1421 days.

(21) Appl. No.: 10/377,364

(22) Filed: Feb. 28, 2003

Related U.S. Application Data

(63) Continuation-in-part of application No. 10/211,822, filed on Aug. 1, 2002, now Pat. No. 7,086,061.

(51) Int. Cl.
*G06F 15/173* (2006.01)
*G06F 9/46* (2006.01)

(52) U.S. Cl. .................. 709/226; 709/223; 709/225; 718/105

(58) Field of Classification Search ......... 709/223–226; 370/229–230; 718/105
See application file for complete search history.

(56) References Cited

U.S. PATENT DOCUMENTS

| | | | |
|---|---|---|---|
| 5,031,094 A | 7/1991 | Toegel et al. ................ | 364/200 |
| 5,359,593 A | 10/1994 | Derby et al. .................. | 370/17 |
| 5,948,061 A | 9/1999 | Merriman et al. ........... | 709/219 |
| 5,951,634 A | 9/1999 | Sitbon et al. ................ | 709/105 |
| 6,006,269 A | 12/1999 | Phaal | |
| 6,006,333 A | 12/1999 | Nielsen | |
| 6,092,178 A | 7/2000 | Jindal et al. ................... | 712/27 |
| 6,112,239 A | 8/2000 | Kenner et al. ............... | 709/224 |
| 6,115,752 A | 9/2000 | Chauhan .................... | 709/241 |
| 6,119,143 A | 9/2000 | Dias et al. | |
| 6,128,279 A | 10/2000 | O'Neil et al. ............... | 370/229 |

(Continued)

OTHER PUBLICATIONS

Albitz, P., et al., "DNS and BIND in a Nutshell," O'Reilly & Associates, Sebastopol, CA, 1992, pp. 214-215.

(Continued)

*Primary Examiner*—Nathan Flynn
*Assistant Examiner*—Joshua Joo
(74) *Attorney, Agent, or Firm*—Schwabe, Williamson & Wyatt P.C.

(57) ABSTRACT

Server load-balancing operation-related data, such as data associated with a system configured for global server load balancing (GSLB) that orders IP addresses into a list based on a set of performance metrics, is tracked. Such operation-related data includes inbound source IP addresses (e.g., the address of the originator of a DNS request), the requested host and zone, identification of the selected "best" IP addresses resulting from application of a GSLB algorithm, and the selection metric used to decide on an IP address as the "best" one. The data includes a count of the selected "best" IP addresses selected via application of the GSLB algorithm, and for each of these IP addresses, the list of deciding performance metrics, along with a count of the number of times each of these metrics in the list was used as a deciding factor in selection of this IP address as the best one. This tracking feature allows better understanding of GSLB policy decisions (such as those associated with performance, maintenance, and troubleshooting) and intelligent deployment of large-scale resilient GSLB networks. The counters can be cleared as needed and without having to reload the system.

32 Claims, 4 Drawing Sheets

U.S. PATENT DOCUMENTS

| | | | | |
|---|---|---|---|---|
| 6,128,642 A | 10/2000 | Doraswamy et al. | ........ | 709/201 |
| 6,148,410 A | 11/2000 | Baskey et al. | | |
| 6,167,445 A | 12/2000 | Gai et al. | | |
| 6,167,446 A | 12/2000 | Lister et al. | .................. | 709/223 |
| 6,182,139 B1 | 1/2001 | Brendel | ....................... | 709/226 |
| 6,195,691 B1 | 2/2001 | Brown | | |
| 6,233,604 B1 | 5/2001 | Van Horne et al. | .......... | 709/203 |
| 6,286,039 B1 | 9/2001 | Van Horne et al. | .......... | 709/221 |
| 6,286,047 B1 | 9/2001 | Ramanathan et al. | ....... | 709/224 |
| 6,304,913 B1 | 10/2001 | Rune | | |
| 6,324,580 B1* | 11/2001 | Jindal et al. | ................... | 709/228 |
| 6,327,622 B1 | 12/2001 | Jindal et al. | | |
| 6,336,137 B1 | 1/2002 | Lee et al. | | |
| 6,381,627 B1 | 4/2002 | Kwan et al. | .................. | 709/201 |
| 6,389,462 B1 | 5/2002 | Cohen et al. | ................. | 709/218 |
| 6,393,473 B1 | 5/2002 | Chu | | |
| 6,405,252 B1 | 6/2002 | Gupta et al. | | |
| 6,427,170 B1 | 7/2002 | Sitaraman et al. | ........... | 709/226 |
| 6,434,118 B1 | 8/2002 | Kirschenbaum | | |
| 6,438,652 B1 | 8/2002 | Jordan et al. | ................. | 711/120 |
| 6,446,121 B1 | 9/2002 | Shah et al. | | |
| 6,449,657 B2 | 9/2002 | Stanbach, Jr. et al. | ....... | 709/245 |
| 6,470,389 B1 | 10/2002 | Chung et al. | ................. | 709/227 |
| 6,473,802 B2 | 10/2002 | Masters | | |
| 6,480,508 B1 | 11/2002 | Mwikalo et al. | ............. | 370/475 |
| 6,487,555 B1 | 11/2002 | Bharat | | |
| 6,490,624 B1 | 12/2002 | Sampson et al. | | |
| 6,549,944 B1 | 4/2003 | Weinberg et al. | ............ | 709/224 |
| 6,578,066 B1 | 6/2003 | Logan et al. | ................. | 709/105 |
| 6,578,077 B1 | 6/2003 | Rakoshitz et al. | | |
| 6,606,643 B1 | 8/2003 | Emens et al. | ................. | 709/203 |
| 6,611,861 B1* | 8/2003 | Schairer et al. | ............. | 709/217 |
| 6,665,702 B1 | 12/2003 | Zisapel et al. | | |
| 6,681,232 B1 | 1/2004 | Sistanizadeh et al. | .... | 707/104.1 |
| 6,681,323 B1 | 1/2004 | Fontanesi et al. | ............... | 713/1 |
| 6,691,165 B1* | 2/2004 | Bruck et al. | ................. | 709/227 |
| 6,725,253 B1 | 4/2004 | Okano et al. | | |
| 6,745,241 B1* | 6/2004 | French et al. | ................. | 709/221 |
| 6,754,699 B2 | 6/2004 | Swildens et al. | | |
| 6,760,775 B1 | 7/2004 | Anerousis | | |
| 6,772,211 B2* | 8/2004 | Lu et al. | ...................... | 709/226 |
| 6,779,017 B1 | 8/2004 | Lamberton et al. | | |
| 6,789,125 B1 | 9/2004 | Aviani et al. | ................. | 709/238 |
| 6,826,198 B2* | 11/2004 | Turina et al. | ................. | 370/467 |
| 6,839,700 B2 | 1/2005 | Doyle et al. | | |
| 6,850,984 B1 | 2/2005 | Kalkunte et al. | ............. | 709/229 |
| 6,874,152 B2 | 3/2005 | Vermeire et al. | | |
| 6,879,995 B1 | 4/2005 | Chinta et al. | ................. | 709/204 |
| 6,883,028 B1* | 4/2005 | Johnson et al. | .............. | 709/226 |
| 6,898,633 B1* | 5/2005 | Lyndersay et al. | ........... | 709/226 |
| 6,901,081 B1 | 5/2005 | Ludwig | | |
| 6,928,485 B1 | 8/2005 | Krishnamurthy et al. | | |
| 6,950,848 B1* | 9/2005 | Yousefi'zadeh | ............. | 709/203 |
| 6,963,914 B1 | 11/2005 | Breitbart et al. | ............. | 709/226 |
| 6,963,917 B1 | 11/2005 | Callis et al. | .................. | 709/227 |
| 6,985,956 B2 | 1/2006 | Luke et al. | | |
| 6,987,763 B2 | 1/2006 | Rochberger et al. | ......... | 370/389 |
| 6,996,615 B1* | 2/2006 | McGuire | .................... | 709/226 |
| 6,996,616 B1 | 2/2006 | Leighton et al. | | |
| 7,000,007 B1 | 2/2006 | Valenti | ....................... | 709/219 |
| 7,020,698 B2 | 3/2006 | Andrews et al. | ............. | 709/223 |
| 7,020,714 B2 | 3/2006 | Kalyanaraman et al. | | |
| 7,028,083 B2 | 4/2006 | Levine et al. | | |
| 7,032,010 B1 | 4/2006 | Swildens et al. | ............ | 709/219 |
| 7,032,031 B2 | 4/2006 | Jungck et al. | | |
| 7,036,039 B2 | 4/2006 | Holland | | |
| 7,058,717 B2 | 6/2006 | Chao et al. | | |
| 7,062,642 B1 | 6/2006 | Langrind et al. | | |
| 7,082,102 B1 | 7/2006 | Wright | | |
| 7,086,061 B1 | 8/2006 | Joshi et al. | ................... | 718/105 |
| 7,089,293 B2 | 8/2006 | Grosner et al. | | |
| 7,114,008 B2 | 9/2006 | Jungck et al. | | |
| 7,127,713 B2 | 10/2006 | Davis et al. | | |
| 7,136,932 B1 | 11/2006 | Schneider | | |
| 7,139,242 B2 | 11/2006 | Bays | | |
| 7,177,933 B2 | 2/2007 | Foth | | |
| 7,185,052 B2 | 2/2007 | Day | | |
| 7,197,547 B1* | 3/2007 | Miller et al. | ................. | 709/223 |
| 7,206,806 B2 | 4/2007 | Pineau | | |
| 7,225,272 B2 | 5/2007 | Kelley et al. | | |
| 7,240,015 B1 | 7/2007 | Karmouch et al. | | |
| 7,240,100 B1 | 7/2007 | Wein et al. | | |
| 7,254,626 B1 | 8/2007 | Kommula et al. | | |
| 7,257,642 B1 | 8/2007 | Bridger et al. | | |
| 7,260,645 B2 | 8/2007 | Bays | | |
| 7,277,954 B1 | 10/2007 | Stewart et al. | | |
| 7,296,088 B1 | 11/2007 | Padmanabhan et al. | | |
| 7,321,926 B1* | 1/2008 | Zhang et al. | ................. | 709/220 |
| 7,330,908 B2 | 2/2008 | Jungck | | |
| 7,383,288 B2 | 6/2008 | Miloushev et al. | | |
| 7,423,977 B1 | 9/2008 | Joshi | | |
| 7,454,500 B1 | 11/2008 | Hsu et al. | | |
| 7,496,651 B1 | 2/2009 | Joshi | | |
| 2001/0049741 A1 | 12/2001 | Skene et al. | | |
| 2001/0052016 A1 | 12/2001 | Skene et al. | ................. | 709/226 |
| 2002/0026551 A1 | 2/2002 | Kamimaki et al. | .......... | 710/260 |
| 2002/0038360 A1 | 3/2002 | Andrews et al. | ............. | 709/223 |
| 2002/0055939 A1 | 5/2002 | Nardone et al. | | |
| 2002/0059170 A1 | 5/2002 | Vange | | |
| 2002/0059464 A1 | 5/2002 | Hata et al. | | |
| 2002/0062372 A1 | 5/2002 | Hong et al. | .................. | 709/225 |
| 2002/0078233 A1 | 6/2002 | Biliris et al. | ................. | 709/238 |
| 2002/0087722 A1* | 7/2002 | Datta et al. | ................... | 709/239 |
| 2002/0091840 A1 | 7/2002 | Pulier et al. | .................. | 709/228 |
| 2002/0112036 A1 | 8/2002 | Bohannon et al. | ........... | 709/220 |
| 2002/0120743 A1 | 8/2002 | Shabtay et al. | .............. | 709/226 |
| 2002/0120763 A1 | 8/2002 | Miloushev et al. | | |
| 2002/0124096 A1 | 9/2002 | Loguinov et al. | | |
| 2002/0133601 A1* | 9/2002 | Kennamer et al. | ........... | 709/229 |
| 2002/0150048 A1 | 10/2002 | Ha et al. | | |
| 2002/0154600 A1 | 10/2002 | Ido et al. | | |
| 2002/0188862 A1 | 12/2002 | Trethewey et al. | .......... | 713/201 |
| 2002/0194324 A1 | 12/2002 | Guha | | |
| 2002/0194335 A1 | 12/2002 | Maynard | ..................... | 709/225 |
| 2003/0018796 A1 | 1/2003 | Chou et al. | | |
| 2003/0031185 A1 | 2/2003 | Kikuchi et al. | | |
| 2003/0035430 A1* | 2/2003 | Islam et al. | ................... | 370/401 |
| 2003/0065711 A1 | 4/2003 | Acharya et al. | ............. | 709/203 |
| 2003/0065763 A1 | 4/2003 | Swildens et al. | ............ | 709/224 |
| 2003/0105797 A1* | 6/2003 | Dolev et al. | .................. | 709/105 |
| 2003/0115283 A1 | 6/2003 | Babir et al. | | |
| 2003/0135509 A1 | 7/2003 | Davis et al. | ................. | 707/100 |
| 2003/0154239 A1 | 8/2003 | Davis et al. | ................. | 709/201 |
| 2003/0210686 A1 | 11/2003 | Terrell et al. | ................ | 370/389 |
| 2003/0210694 A1 | 11/2003 | Jayaraman et al. | .......... | 370/392 |
| 2003/0229697 A1 | 12/2003 | Borella | | |
| 2004/0019680 A1 | 1/2004 | Chao et al. | | |
| 2004/0024872 A1 | 2/2004 | Kelley et al. | ................. | 709/225 |
| 2004/0039847 A1 | 2/2004 | Persson et al. | | |
| 2004/0064577 A1 | 4/2004 | Dahlin et al. | | |
| 2004/0194102 A1 | 9/2004 | Neerdaels | | |
| 2004/0249939 A1 | 12/2004 | Amini et al. | | |
| 2004/0249971 A1 | 12/2004 | Klinker | | |
| 2005/0021883 A1 | 1/2005 | Shishizuka et al. | ............ | 710/20 |
| 2005/0033858 A1* | 2/2005 | Swildens et al. | ............ | 709/232 |
| 2005/0086295 A1 | 4/2005 | Cunningham et al. | ....... | 709/203 |
| 2005/0149531 A1 | 7/2005 | Srivastava | .................... | 707/10 |
| 2005/0169180 A1 | 8/2005 | Ludwig | | |
| 2005/0286416 A1 | 12/2005 | Shimonishi et al. | | |
| 2006/0020715 A1 | 1/2006 | Jungck | | |
| 2006/0036743 A1 | 2/2006 | Deng et al. | | |

| | | | |
|---|---|---|---|
| 2007/0168547 | A1 | 7/2007 | Krywaniuk |

OTHER PUBLICATIONS

Alteon Systems, "Alteon WebSystems Introduces New Layer 4+ Switching Technology that Speeds User Access to Internet Servers," Dec. 7, 1998, retrieved Nov. 5, 2002, from http://web.archive.org/web/20000919190409/www.alteonwebsystems.com/press/releases/1998/120798.asp, pp. 1-4.

Alteon WebSystems, Inc., "Enhancing Web User Experience with Global Server Load Balancing," Jun. 1999, 8 pages.

Krapf, E., "Alteon's Global Server Load Balancing," *Business Communications Review*, Jan. 1999, p. 60, retrieved Oct. 25, 2002, from http://www.bcr.com/bcrmag/1999/01/p60.asp, 3 pages.

Nortel Networks, "Alteon Personal Content Director," © 2001, can be retrieved from http://www.nortelnetworks.com/personalinternet, 4 pages.

IBM Corp., *IBM WebSphere Performance Pack: Load Balancing with IBM SecureWay Network Dispatcher*, First Edition, Chapters 1, 2, 4, and 8, Oct. 1999.

IBM Corp., *SecureWay® Network Dispatcher: User's Guide—Version 2.1 for AIX, Solaris, and Windows NT*, Third Edition, Chapters 3, 4, 9, 10, 11, and Appendices C & E, Mar. 1999.

Yerxa, G., "ACElerate on Fast Track for Load-Balancing," Mar. 8, 1999, retrieved Nov. 5, 2002, from http://www.networkcomputing.com/1005/1005sp2.html, pp. 1-4.

AlteonWebSystems, "PCD White Paper," *AlteonWebSystems*, pp. 1-8, Mar. 2001.

Cardellini, V., et al., "Dynamic Load Balancing on Web-server Systems," *IEEE Internet Computing*, 3(3):28-39, May-Jun. 1999.

Foundry Networks, Inc., "Server Load Balancing in Today's Web-enabled Enterprises," *White Paper*, pp. 1-10, Apr. 2002.

Genova, Z., et al., "Challenges in URL Switching for Implementing Globally Distributed Web Sites," *IEEE*, pp. 89-94, 2000.

Bestavros, Azer, "WWW Traffic Reduction and Load Balancing through Server-Based Caching," *IEEE Concurrency*, pp. 56-67, Jan.-Mar. 1997.

Paul, Arindam et al., "Balancing Web Server Load for Adaptable Video Distribution," *IEEE* pp. 469-476, 2000.

Genova, Z., et al., "Challenges to URL Switching for Implementing Globally Distributed Web Sites," Department of Computer Science and Engineering, University of South Florida, pp. 1-9, Aug. 11, 2000.

U.S. Appl. No. 09/670,487, filed Sep. 26, 2000, Hsu et al.
U.S. Appl. No. 10/206,580, filed Jul. 25, 2002, Kommula et al.
U.S. Appl. No. 10/214,921, filed Aug. 7, 2002, Kommula.
U.S. Appl. No. 10/305,823, filed Nov. 27, 2002, Joshi et al.
U.S. Appl. No. 10/376,903, filed Feb. 28, 2003, Kommula.
U.S. Appl. No. 10/674,627, filed Sep. 29, 2003, Joshi.
U.S. Appl. No. 10/839,919, filed May 6, 2004, Joshi.
U.S. Appl. No. 10/840,496, filed May 6, 2004, Joshi.
U.S. Appl. No. 10/924,552, filed Aug. 23, 2004, Joshi.
U.S. Appl. No. 11/429,177, filed May 5, 2006, Joshi et al.
U.S. Appl. No. 11/707,697 filed Feb. 16, 2007.
Joshi, "Smoothing Algorithm for Round Trip Time (RTT) Measurements," assigned U.S. Appl. No. 12/177,021, filed Jul. 21, 2008.
U.S. Appl. No. 11/741,480, filed Apr. 27, 2007, Hsu et al.
U.S. Appl. No. 12/272,618, filed Nov. 17, 2008, Hsu et al.
U.S. Appl. No. 12/353,701, filed Jan. 14, 2009, Joshi.
Doeringer et al., "Routing on Longest-Matching Prefixes," IEEE/ACM Transactions on Networking, vol. 4, No. 1, Feb. 1996, pp. 86-97.

* cited by examiner

METHOD AND SYSTEM TO CLEAR COUNTERS USED FOR STATISTICAL TRACKING FOR GLOBAL SERVER LOAD BALANCING

CROSS-REFERENCE TO RELATED APPLICATION

The present application is a continuation-in-part of U.S. application Ser. No. 10/211,822, entitled "STATISTICAL TRACKING FOR GLOBAL SERVER LOAD BALANCING," filed Aug. 1, 2002, assigned to the same assignee as the present application, and which is incorporated herein by reference its entirety.

BACKGROUND OF THE INVENTION

1. Field of the Invention

This disclosure relates generally to load balancing among servers. More particularly but not exclusively, the present disclosure relates to clearing counters that have been used in connection with tracking data associated with operation of load balancing systems that provide the address of a server expected to serve the client with a high performance in a given application.

2. Description of the Related Art

Under the TCP/IP protocol, when a client provides a symbolic name ("URL") to request access to an application program or another type of resource, the host name portion of the URL needs to be resolved into an IP address of a server for that application program or resource. For example, the URL (e.g., http colon double slash www dot foundrynet dotcom slash index dot htm) includes a host name portion www-.foundrynet.com that needs to be resolved into an IP address. The host name portion is first provided by the client to a local name resolver, which then queries a local DNS server to obtain a corresponding IP address. If a corresponding IP address is not locally cached at the time of the query, or if the "time-to-live" (TTL) of a corresponding IP address cached locally has expired, the DNS server then acts as a resolver and dispatches a recursive query to another DNS server. This process is repeated until an authoritative DNS server for the domain (e.g., foundrynet.com, in this example) is reached. The authoritative DNS server returns one or more IP addresses, each corresponding to an address at which a server hosting the application ("host server") under the host name can be reached. These IP addresses are propagated back via the local DNS server to the original resolver. The application at the client then uses one of the IP addresses to establish a TCP connection with the corresponding host server. Each DNS server caches the list of IP addresses received from the authoritative DNS for responding to future queries regarding the same host name, until the TTL of the IP addresses expires.

To provide some load sharing among the host servers, many authoritative DNS servers use a simple round-robin algorithm to rotate the IP addresses in a list of responsive IP addresses, so as to distribute equally the requests for access among the host servers.

The conventional method described above for resolving a host name to its IP addresses has several shortcomings. First, the authoritative DNS server does not detect a server that is down. Consequently, the authoritative DNS server continues to return a disabled host server's IP address until an external agent updates the authoritative DNS server's resource records. Second, when providing its list of IP addresses, the authoritative DNS server does not take into consideration the host servers' locations relative to the client. The geographical distance between the server and a client is a factor affecting the response time for the client's access to the host server. For example, traffic conditions being equal, a client from Japan could receive better response time from a host server in Japan than from a host server in New York. Further, the conventional DNS algorithm allows invalid IP addresses (e.g., that corresponding to a downed server) to persist in a local DNS server until the TTL for the invalid IP address expires.

One technique to address these shortcomings is a global server load balancing system provided by Foundry Networks, Inc. of San Jose, Calif. As one example, Foundry provides the ServerIron product to add intelligence to authoritative DNS servers by serving as a proxy to these servers. The ServerIron has a global server load balancing (GSLB) feature that intelligently uses health-checks and other methods to assess the availability and responsiveness of the host sites in the DNS reply. When necessary, the ServerIron exchanges the IP address at the top of the address list returned by the authoritative DNS with another IP address selected from the list, based on a set of performance metrics indicative of which particular host server may provide the optimum access. Thus, the GSLB feature ensures that a client always receives a DNS reply for a host site that is available and is the best choice among the available hosts. Example embodiments for global server load balancing are disclosed in U.S. application Ser. No. 09/670,487, entitled "GLOBAL SERVER LOAD BALANCING," filed Sep. 26, 2000, assigned to the same assignee as the present application, and which is incorporated herein by reference its entirety.

While this GSLB technique provides improvements in server load balancing, it would be beneficial to be able to provide GSLB operation-related data for purposes of deployment planning, trouble-shooting, maintenance, and the like, for instance.

BRIEF SUMMARY OF THE INVENTION

One aspect of the present invention provides a method for a load balancing system. The method includes determining if at least one counter in the load balancing system has data therein that is indicative of selection of an address as an optimum address. If it is determined that the at least one counter has the data therein, the method clears the at least one counter without interruption of service in the load balancing system.

DETAILED DESCRIPTION

Figure 1:
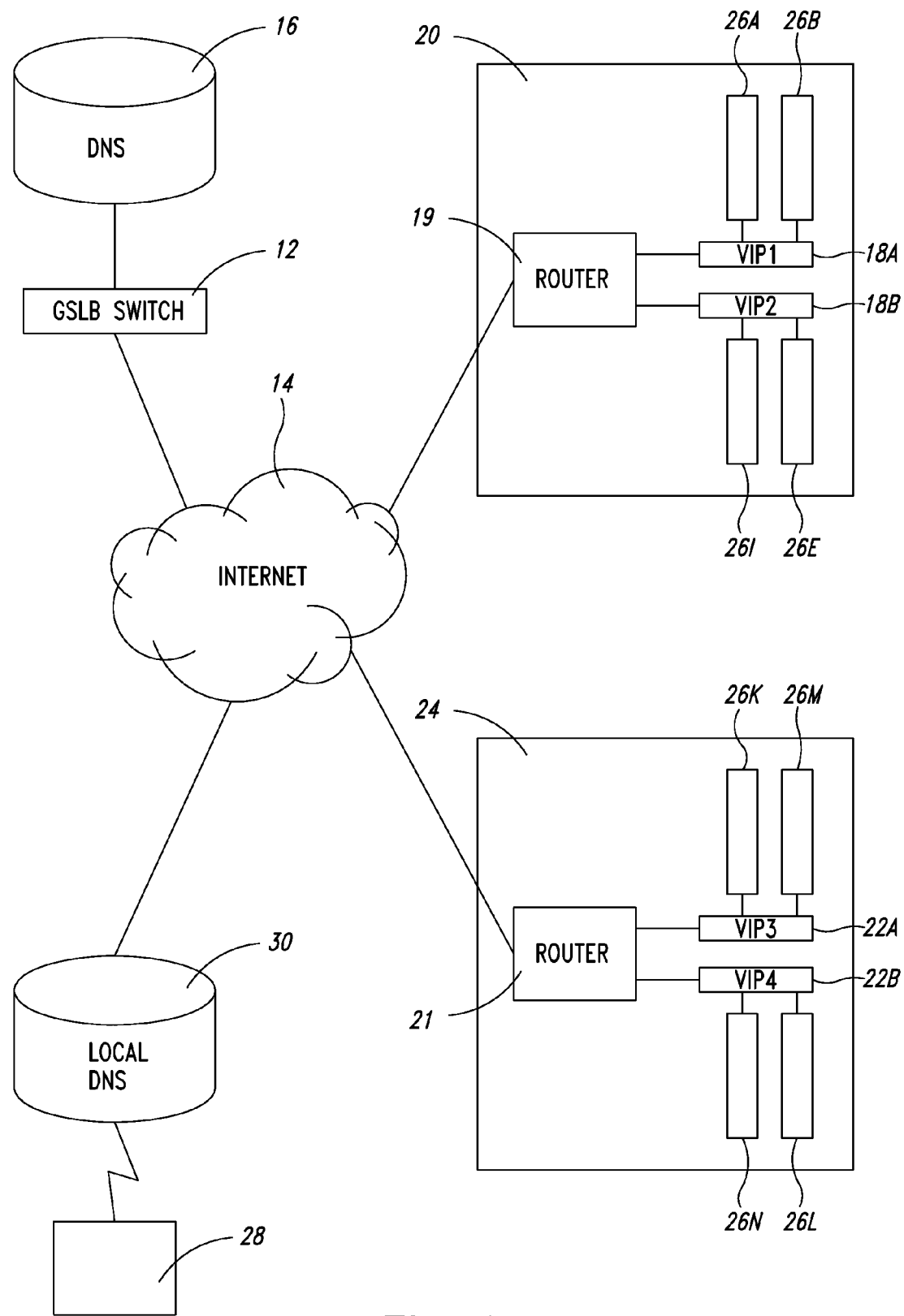
FIG. 1 illustrates a global server load-balancing configuration with which one embodiment of the invention may be implemented.

Embodiments of techniques to clear counters or other data repositories used for statistical tracking associated with load balancing among servers are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment of the invention provides a method to track load-balancing operation-related data, such as data associated with a system configured for GSLB that orders IP addresses into a list based on a set of performance metrics. Such operation-related data can include, but not be limited to, inbound source IP addresses (e.g., the address of the originator of a DNS request), the requested host and zone, an identification and count of the selected "best" IP addresses, the selection metric used to decide on a particular best IP address, a count of the number of times a particular metric was used as a deciding factor in selection of the best IP addresses, percentage selection of one IP address with respect to other candidates for the domain name, and others.

As an example, one of the performance metrics may be a health check associated with querying, either periodically or on demand, host servers and relevant applications hosted on the host servers to determine the "health" (e.g., whether or not it is available). If, for illustrative purposes, the tracking data shows that out of 100 DNS queries, the health check metric was used as the deciding factor 95 times, then this situation may indicate that several servers may be "down," since it suggests that at least some of the servers are failing the health check. System maintenance personnel may then be dispatched to repair the downed servers, or to configure or install new servers that can assist in balancing the load.

In one embodiment, such load-balancing operation-related data can be provided and logged to a server, such as a system log (or "syslog") server. Alternatively or in addition to the syslog server, one or more counters or other type of data repository can be used to keep track of the counts and other tracked data. The tracking feature can be enabled/disabled as needed, such as disabling the feature when reporting or troubleshooting is not required.

However, even if this GSLB operation-related data is gathered, there are situations where storage locations of this data need to be cleared, so that new data can be stored and/or new parameters can be calculated. Typically, this data-clearing operation would have to involve reloading of the system (e.g., reinstallation of a GSLB switch). In many situations, system reloading is not feasible or practical, since doing so would require temporarily disabling active connections or otherwise generating system downtime.

According to one embodiment of the invention, the counters are used in connection with at least some of the metrics, such as a least response metric that favors an IP address that has been selected the least number of times when compared to other candidates—the counter(s) keep a count of instances when an IP address is selected. One embodiment of the invention provides the ability to clear such counters in certain situations, such as to prevent a particular IP address from being flooded with traffic after it comes back online—clearing the counters for the zone in this situation can prevent this undesirable consequence, since all IP addresses for that zone would be considered equal by the least response metric.

Moreover, clearing counters can be performed by one embodiment of the invention without having to reload the GSLB switch, thereby avoiding the risk of communication disruption or other service interruption. Counters may be cleared on a per-zone basis or globally for all zones configured for GSLB. Other uses of the counter-clearing feature include, but are not limited to, testing a GSLB implementation, analyzing the effectiveness of each GSLB metric by adjusting the metric order, performing an initial system start (such as a "cold start" when the system has just come online and DNS requests have not yet been served), and others.

FIG. 1 illustrates one example global server load-balancing configuration with which an embodiment of the invention may be used. As shown in FIG. 1, a GSLB switch 12 is connected to an Internet 14 and acts as a proxy to an authoritative Domain Name System (DNS) server 16 for the domain "foundrynet.com" (for example). That is, while the actual DNS service is provided by DNS server 16, the IP address known to the rest of the Internet 14 for the authoritative DNS server of the domain "foundrynet.com" is a virtual IP (VIP) address configured on GSLB switch 12. Of course, DNS server 16 can also act simultaneously as an authoritative DNS for other domains. GSLB switch 12 communicates, via Internet 14, with site switches 18A and 18B at site 20, site switches 22A and 22B at site 24, and any other similarly configured site switches. Site switch 18A, 18B, 22A and 22B are shown, for example, connected to routers 19 and 21 respectively and to servers 26A, . . . , 26I, . . . 26N. Some or all of servers 26A, . . . , 26I, . . . , 26N may host application server programs (e.g., http and ftp). These host servers are reached through site switches 18A, 18B, 22A and 22B using one or more virtual IP addresses configured at the site switches, which act as proxies to the host servers. A suitable switch for implementing either GSLB switch 12 or any of site switches 18A, 18B, 22A and 22B is the "ServerIron" product available from Foundry Networks, Inc. of San Jose, Calif.

FIG. 1 also shows a client program 28 connected to Internet 14, and communicates with local DNS server 30. When a browser on client program 28 requests a web page, for example, using a Universal Resource Locator (URL), such as http colon double slash www dot foundrynet dotcom slash index dot htm, a query is sent to a local DNS server 30 to resolve the symbolic host name www dot foundrynet dotcom to an IP address of a host server. The client program 28 receives from DNS server 30 a list of IP addresses corresponding to the resolved host name. This list of IP addresses is either retrieved from local DNS server 30's cache, if the TTL of the responsive IP addresses in the cache has not expired, or obtained from GSLB switch 12, as a result of a recursive query. Unlike the prior art, however, this list of IP addresses is ordered by GSLB switch 12 based on performance metrics as described in further detail in U.S. application Ser. No. 09/670,487 referenced above; in U.S. application Ser. No. 10/206,580, entitled "GLOBAL SERVER LOAD BALANCING," filed Jul. 25, 2002, with inventors Sunanda L. Kommula et al. (disclosing embodiments of a connection-load metric for GSLB); in U.S. application Ser. No. 10/305,823, entitled "DISTRIBUTED HEALTH CHECK FOR GLOBAL SERVER LOAD BALANCING," filed Nov. 27, 2002, with inventor Prajakta S. Joshi et al. (disclosing embodiments for distributing health check tasks to peer metric agents); and in U.S. application Ser. No. 10/376,903, entitled "GLOBAL SERVER LOAD BALANCING," filed concurrently herewith, with inventor Sunanda L. Kommula (disclosing embodiments of weighted site, weighted IP, and active bindings metrics); all of which are assigned to the same assignee as the present application and incorporated herein by reference in their entireties. For the sake of brevity, these various performance metrics and the manner in which they are used in a GSLB algorithm to identify best sites in a list of IP addresses are only summarized and not described in detail herein. Such additional details may be found in these co-pending applications.

In the remainder of this detailed description, for the purpose of illustrating embodiments of the present invention only, the list of IP addresses returned are assumed to be the virtual IP addresses configured on the proxy servers at switches 18A, 18B, 22A and 22B (sites 20 and 24). In one embodiment when the authoritative DNS server 16 resolves a host name in a query and returns one or more IP addresses, the GSLB switch 12 determines (using the performance metrics) which site switch would provide the best expected performance (e.g., response time) for client 28 and returns the IP address list with a virtual IP address configured at that site switch placed at the top. (Other forms of ranking or weighting the IP addresses in the list can also be possible.) Client program 28 can receive the ordered list of IP addresses, and typically selects the first IP address on the list to access the corresponding host server.

Figure 3:
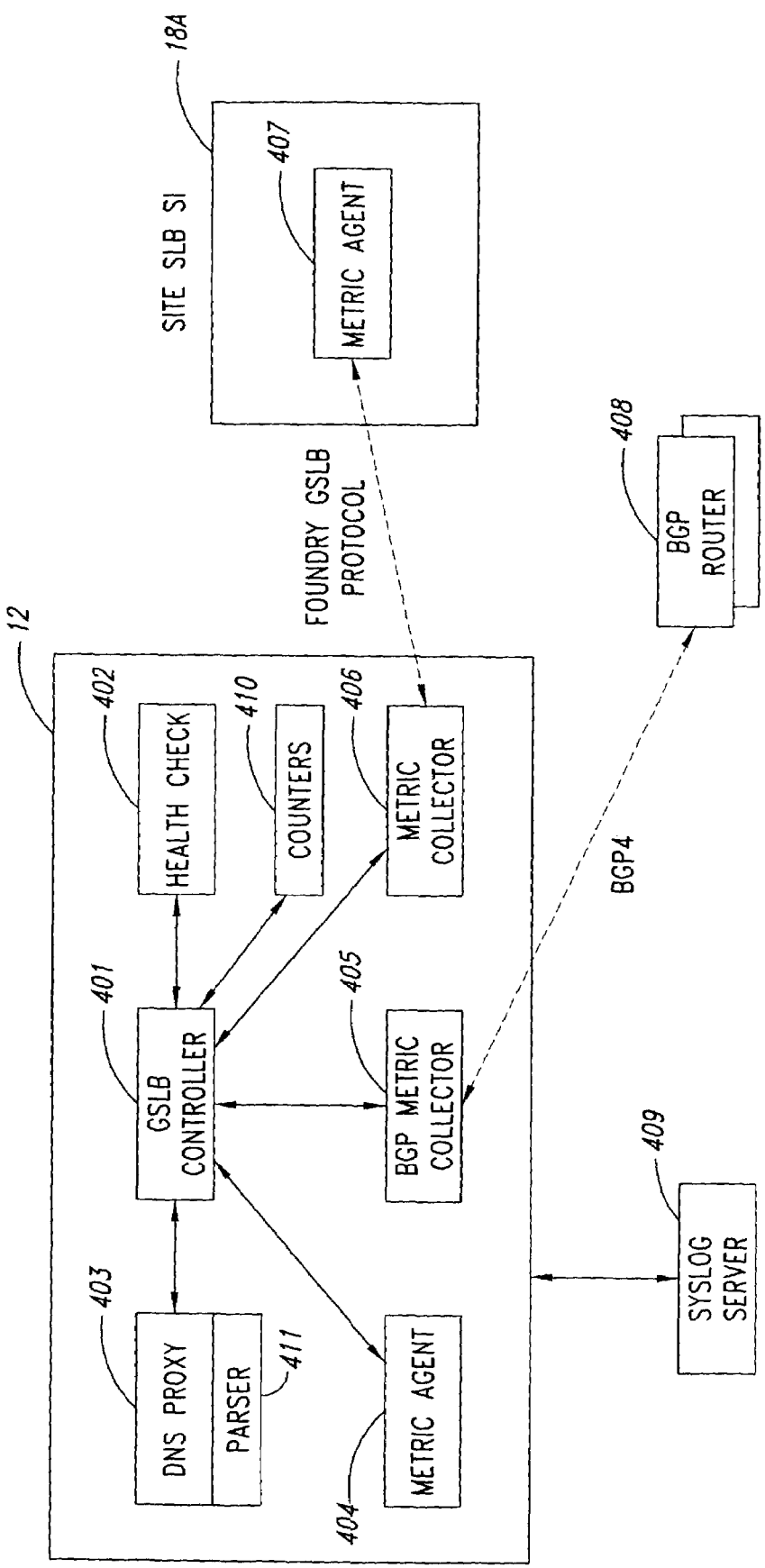
FIG. 3 is a block diagram showing the functional modules of a GSLB switch and a site switch relevant to tracking data associated with the global server load balancing operation, including counter(s) that can be cleared in accordance with one embodiment of the invention.

FIG. 3 is a block diagram showing the functional modules of GSLB switch 12 and site switch 18A (for instance) relevant to the global server load balancing function in one embodiment. As shown in FIG. 3, GSLB switch 12 includes a GSLB switch controller 401, health check module 402, DNS proxy module 403, metric agent 404, routing metric collector 405, and metric collector 406. GSLB switch controller 401 provides general control functions for the operation of GSLB switch 12. Health check module 402 is responsible for querying, either periodically or on demand, host servers and relevant applications hosted on the host servers to determine the "health" (e.g., whether or not it is available) of each host server and each relevant application. The metric collector 406 communicates with metric agents in site-specific switches (e.g., FIG. 3 shows metric collector 406 communicating with remote metric agent 407 of a site server load balancing ServerIron or "SLB SI") to collect site-specific metrics (e.g., number of available sessions on a specific host server and/or connection-load data indicative of connections-per-second at that host server). In an embodiment, the metric collector 406 can communicate with the remote metric agent 407 to obtain data for the active bindings metric. Active bindings is a measure of the number of active real servers bound to a virtual IP address residing on a GSLB site. The active bindings metric bases its selection of the best IP address on this number and prefers a VIP with the highest number of active-bindings.

Routing metric collector 405 collects routing information from routers (e.g., topological distances between nodes on the Internet). FIG. 3 shows, for example, router 408 providing routing metric collector 405 with routing metrics (e.g., topological distance between the load balancing switch and the router), using the Border Gateway Protocol (BGP). DNS proxy module 403 (A) receives incoming DNS requests, (B) provides the host names to be resolved to DNS server 16, (C) receives from DNS server 16 a list of responsive IP addresses, (D) orders the IP addresses on the list received from DNS server 16 according to an embodiment of the present invention, using the metrics collected by routing-metric collector 405 and site specific collector 406, and values of any other relevant parameter, and (E) provides the ordered list of IP addresses to the requesting DNS server. Since GSLB switch 12 can also act as a site switch, GSLB switch 12 is provided a metric agent 404 for collecting metrics for a metric collector.

In one embodiment, the GSLB switch controller 401 can be programmed with data to be used for at least one of weighted site, weighted IP, or active bindings metrics. For example for the weighted site metric, the GSLB switch controller 401 can be programmed with the assigned weights for particular sites (e.g., the sites 20 and 24). For example for the weighted IP metric, the GSLB switch controller 401 can be programmed with the assigned weights for IP addresses for a particular zone. Alternatively or in addition to being programmed into the GSLB switch controller 401, these weight assignments can be stored in a component that is remote from, but accessible to, the GSLB switch controller 401 (or other component of the GSLB switch that can use this metric to reorder address lists).

One embodiment of the present invention provides a method to track inbound DNS requests. For example, the GSLB switch 12 is provided with capability to track data associated with the originator of the DNS request and with the decision process used to select the best IP address for that DNS request. Such tracking data can include the inbound source IP address of the originator of the DNS request, the requested host names and zone (e.g., for www dot gslb dot-com, the host is "www" and the zone is "gslb.com"), the IP address that was selected as "best" in response to that DNS request, and the particular selection metric that was used to decide on that best IP address. It is appreciated that other types of data associated with the inbound DNS request and with the decision to select an IP address may be tracked by other embodiments of the invention, and that the types of data to be tracked are not restricted to those specifically identified herein.

In an embodiment of the invention, at least some of the data to be tracked can originate from the DNS proxy module 403 in cooperation with the switch controller 401 as needed. For example, since the DNS proxy module 403 receives incoming DNS requests and provides the host names to be resolved to the authoritative DNS server 16 and also receives the replies to the queries from the authoritative DNS server 16, the DNS proxy module 403 can include or otherwise use a parser 411 (or other software component) to identify and extract (from the DNS reply received from the authoritative DNS server 16 in one embodiment and/or from the original request in another embodiment) the source IP address and the requested zone and host.

To track the returned best IP address and the particular metric used to identify this IP address, one embodiment of the invention uses the GSLB switch controller 401 to track this information while performing and completing the GSLB algorithm. Alternatively or in addition, the DNS proxy module 403 (via use of the parser 411) may be used to identify and extract the best IP address from the list of responsive IP addresses after completion of the GSLB algorithm.

In an embodiment, one or more servers external to the GSLB switch 12 can be used to receive and log (for storage and subsequent access) the data tracked in the manner described above. An example of such a server is a system log ("syslog") server 409 shown in FIG. 3 that includes a machine-readable storage medium to store the tracked data. The syslog server 409 can be communicatively coupled to the GSLB switch 12 by way of the DNS proxy module 403 or via other communication interface suitable to transfer the tracked data from the GSLB switch 12 to the syslog server 409.

Alternatively or in addition, the data-logging capabilities provided by the syslog server 409 can be configured in the GSLB switch 12 itself, such as a machine-readable storage medium of the GSLB switch 12 that is configured to receive and log the tracked data and to provide accessibility to the logged data for troubleshooting and maintenance purposes or for other purposes. Still alternatively or in addition, syslog servers 409 may be located at the sites 20 and 24, and can be configured to transfer their logged data to other syslog servers 409, if needed, for further processing, storage, and access.

The tracking at the syslog server 409 and/or at the GSLB switch 12 can be enabled or disabled via one or more user (e.g., a system administrator) commands. For instance, a command line interface (CLI) command can be used to enable/disable the logging of all the data, or selective ones of the data in one other embodiment. The CLI command can be entered via any suitable user interface in the GSLB system, and by default in an embodiment, the logging is disabled until later specifically enabled by a CLI command.

A sample output of the syslog server 409, which may be used for troubleshooting, maintenance, or deployment planning purposes is (for a client with a source IP address of 1.1.1.21 sending a DNS query for www dot gslb dotcom):

20:52:02 User.Info 1.1.1.102 GSLB DNS request: src-ip=001.001.001.021 best-ip=001.001.001.101 Host=www Zone=gslb.com Metric=health-check As shown above, this sample output indicates the source IP address, the zone and host, the IP address (1.1.1.101) selected as best, and an identification of which metric (health check) was used to select the best IP address.

Another embodiment of the invention provides counters at the metric-level granularity to count the number of times a particular metric was used as the deciding factor over other metrics in identifying the best IP address. As an additional feature, other counters can be provided that track the number of times each IP address (e.g., VIP address) was selected as the "best" IP address in comparison with other candidate IP addresses, the percentage of selection of one IP address with respect to other candidates, and so on. The counters 410 can comprise any type of suitable hardware or software (or combination thereof) that can operate as a data repository for the purposes described herein, and may be located at any suitable location internal or external to the GSLB switch 12, including at the syslog server 409.

FIG. 3 shows one embodiment of the GSLB switch 12 that includes a plurality of counters 410 to count the number of times each particular metric was used to identify the best IP address or to count the other types of selection decisions identified above. While the embodiment of FIG. 3 shows the counters 410 as being separate components, it is appreciated that counting capability can be configured in the metric collectors 405 and 406 or in other components of the GSLB switch 12, or combination of components thereof. According to an embodiment, a separate counter 410 is provided for each VIP, thereby providing a count of how many times that VIP was chosen as the best IP address based on a particular metric. Thus, if VIP-1 was selected 100 times, its metric counter would show that of those 100 times, VIP-1 was selected 20 times based on round trip time (RTT), 40 times based on capacity, 40 times based on round-robin, for example.

In an embodiment, additional counter(s) can be provided to count the number of times (e.g., 100 times in the preceding example) that each VIP is selected. These additional counters can be configured similarly as the counters 410 within the GSLB switch 12, except that they are counting a different type of occurrence.

Again, the count data can be accessed and viewed by a system administrator for purposes of maintenance, troubleshooting, or pre-deployment planning. For instance, if the count data for a particular VIP shows a very high count for the connection-load metric, then this data suggests that the VIP has won over the other choices because the others failed to pass the connection-load limit threshold. This indicates that the other VIPs are facing a very high load of connections-per-second, which signals the system administrator to take proper measures, if that is not intended. Such measures can include, for example, diverting some of the connections to less-busy servers or installing additional servers to handle the heavy load.

As another example, if a system administrator suspects that something is wrong with addresses being provided to Australian clients, the administrator can enable the tracking mechanism to log client requests and DNS replies. In the log data, if an Australian client is given a United States address based on RTT, this may indicate that the more-closer Australian server(s) are down or busy, and therefore need troubleshooting service so that the Australian clients can be provided with the IP addresses for the Australian servers.

Moreover, the counters 410 can be used in connection with implementation of at least some of the metrics themselves, such as the least response, round robin, weighted site, or weighted IP metrics. Each of these metrics base the next selection on the number of times a particular IP address has been selected, so as to give other suitable address candidates an opportunity to be selected. For example, the weighted site metric selects an IP address that has the least relative weight, the calculation of which is based on the data kept in the selection counter for that IP address.

In accordance with an embodiment of the invention, the counters 410 can be cleared without having to reload (or otherwise reinitialize or reinstall) the GSLB switch 12. This allows the GSLB switch 12 to continue performing its address reordering and not have to power down, thereby maintaining existing communications and avoiding the risk of loss data. As will be described later below, this clearing operation may be performed on a per zone basis or globally for all zones, using a command at the executable or configuration level.

There are several non-exhaustive situations where the clearing operation can be used. For example, the user (e.g., a system administrator) may wish to do a "clean start," similar to a cold start when the system has just come online and the GSLB switch controller 401 has not yet served any DNS requests from a particular client program 28. The clearing capability provided by one embodiment allows the user to perform the clean start without having to reload the GSLB switch 12.

As another example, the clearing operation provided by one embodiment can be used to maximize the reliability of at least some of the metrics that rely on count data to make decisions. For instance, the least response metric favors an IP address that has been selected the least number of times when compared to other candidates. If a particular IP address has been down or otherwise inaccessible for some time, that IP address might get flooded with subsequent traffic after coming back online (since its corresponding selection counter would have a low count as a result of the down time). Clearing the counters associated with all IP address for a zone can prevent this scenario, since all IP addresses will be considered equal under the least response metric (e.g., their selection counters will all show a count of 0 previous selections). Similarly, the weighted site and weighted IP metrics can be used in conjunction with cleared counters, so as to prevent all traffic from being sent to a particular site or IP address that has come back online after a period of shutdown.

As yet another example, the clear counters operation provided by one embodiment of the invention can be used in connection with testing of the GSLB implementation before wide-scale deployment. The user can analyze the effectiveness of each GSLB metric in a restricted environment, by adjusting the metric order, enabling or disabling certain metrics, comparing metric results, and so forth, via use of the counter-clearing feature to reset or otherwise start anew for each new test, without having to repeatedly reload the GSLB switch 12.

With regards to the metrics that are applicable to the tracking operations described above, the metrics used in a GSLB switch 12 in one embodiment include, but are not limited to: (a) the health of each host server and selected applications, (b) the assigned weights under the weighted site metric, or under the weighted IP metric in the alternative, (c) each site switch's session capacity threshold, (d) the round trip time (RTT) between a site switch and a client in a previous access, (e) the geographical location of a host server, (f) the connection-load measure of new connections-per-second at a site switch, (g) the current available session capacity in each site switch, (h) active bindings or the measure of the number of active real servers bound to a VIP residing on a GSLB site, (i) the "flashback" speed between each site switch and the GSLB switch (i.e., how quickly each site switch responds to a health check from the GSLB switch), and (j) the "Least Response Selection" (LRS) policy that prefers the site least selected previously. Many of these performance metrics can be provided default values. Each individual metric can be used in any order, such as an order of (a) through (j) identified above, and each metric can be disabled if desired. In one embodiment, the LRS metric is always enabled.

To briefly describe herein one embodiment of a GSLB algorithm (embodiments of which are described in further detail in the co-pending applications previously identified), assume for purposes of illustration that the metric order is (a) through (i) as identified above. Upon receiving the IP address list from the authoritative DNS server 16, GSLB switch 12 performs, for each IP address on the IP address list (e.g., host server 26I connected to site switch 18B), a layer 4 health check and a layer 7 check. Such a health check can be achieved, for example, by a "ping-like" operation defined under the relevant protocol, such as sending SYN/ACK packets under the TCP protocol. If a host server or an associated application fails any of the health checks it is disqualified from being the "best" site and may be excluded from the IP address list to be returned to client program 28.

If the resulting list of IP addresses has only one IP address, then the list of IP addresses is returned to client program 28. Otherwise if there are multiple IP addresses remaining, the IP address list is assessed under the next metric in the algorithm, which is either the weighted site or weighted IP metric. The IP address with the least relative weight is selected.

If the resulting list of IP addresses has only one IP address, then the list of IP addresses is returned to client program 28. Otherwise if there are multiple IP addresses remaining, the IP address list is assessed under the next metric in the algorithm, which is the "capacity threshold" of the site switch serving that IP address. The virtual IP address configured at site switch 18B, for example, may be disqualified from being the "best" IP address if the number of sessions for switch 18B exceed a predetermined threshold percentage (e.g., 90%) of the maximum number of sessions that the site switch can serve. If the resulting list of IP addresses has only one IP address, then list of IP addresses is returned to client program 28.

If, however, the IP address list has multiple IP addresses, the remaining IP addresses on the list can then be reordered based upon a round-trip time (RTT) between the site switch for the IP address (e.g., site switch 18B) and the client (e.g., client 28). The RTT is computed (and stored), for instance, for the interval between the time when a client machine requests a TCP connection to a proxy server configured on a site switch, sending the proxy server a TCP SYN packet, and the time a site switch receives from the client program a TCP ACK packet. Again, if the top entries on the list of IP addresses do not have equal RTTs, the list of IP addresses is returned to client program 28.

If multiple sites have equal RTTs, then the list is reordered based upon the next metric in the GSLB algorithm, which is based on the location (geography) of the host server. The GSLB switch prefers an IP address that is in the same geographical region as the client machine in an embodiment. If the top two entries on the IP list are not equally ranked, the IP list is sent to the client program 28.

After using the geographic metric, if multiple sites are of equal rank for the best site, the IP addresses can then be reordered based upon site connection load. The connection-load metric feature allows comparison of sites based on the connection-load on their respective agent (e.g., at the metric agent 407 of the site ServerIron switch 18A in FIG. 3, for instance). The connection-load is a measure of new connections-per-second on the agent 407 in one embodiment. If a calculated average load is less than a specified load limit, the site is passed on to the next stage of the GSLB algorithm—otherwise that site is eliminated/rejected from the set of potential candidates.

If there are no multiple candidates at the top of the IP list that have passed the connection-load metric (or there are none of equal rank), then the IP address list is sent to the client program 28. If multiple sites are of equal rank for the best site, the IP addresses can then be reordered based upon available session capacity, which is the next metric in the GSLB algorithm. For example in one embodiment, if switch 18A has 1,000,000 sessions available and switch 22B has 800,000 sessions available, switch 18A is then preferred, if a tolerance limit, representing the difference in sessions available expressed as a percentage of capacity in the larger switch, is exceeded. If an IP address is preferred, the IP address will be placed at the top of the IP address list, and is then returned to the requesting entity. Otherwise, if the session capacity does not resolve the best IP address, then resolution is based upon the active bindings metric. If the active bindings metric does not resolve the best IP address, then the algorithm uses the next metric that is based on a "flashback" speed. The flashback speed is a time required for a site switch to respond to layers 4 and 7 health checks by the GSLB switch in one embodiment. The preferred IP address will correspond to a flashback speed exceeding the next one by a preset tolerance limit.

If a best IP address is resolved, the IP address list is sent to client program 28. Otherwise, an IP address in the site that is least often selected to be the "best" site (e.g., the LRS metric) is chosen. The IP address list is then sent to client program 28. Upon receipt of the IP address list, the client program 28 uses the best IP address selected (i.e., the top of the list) to establish a TCP connection with a host server.

Figure 2A:
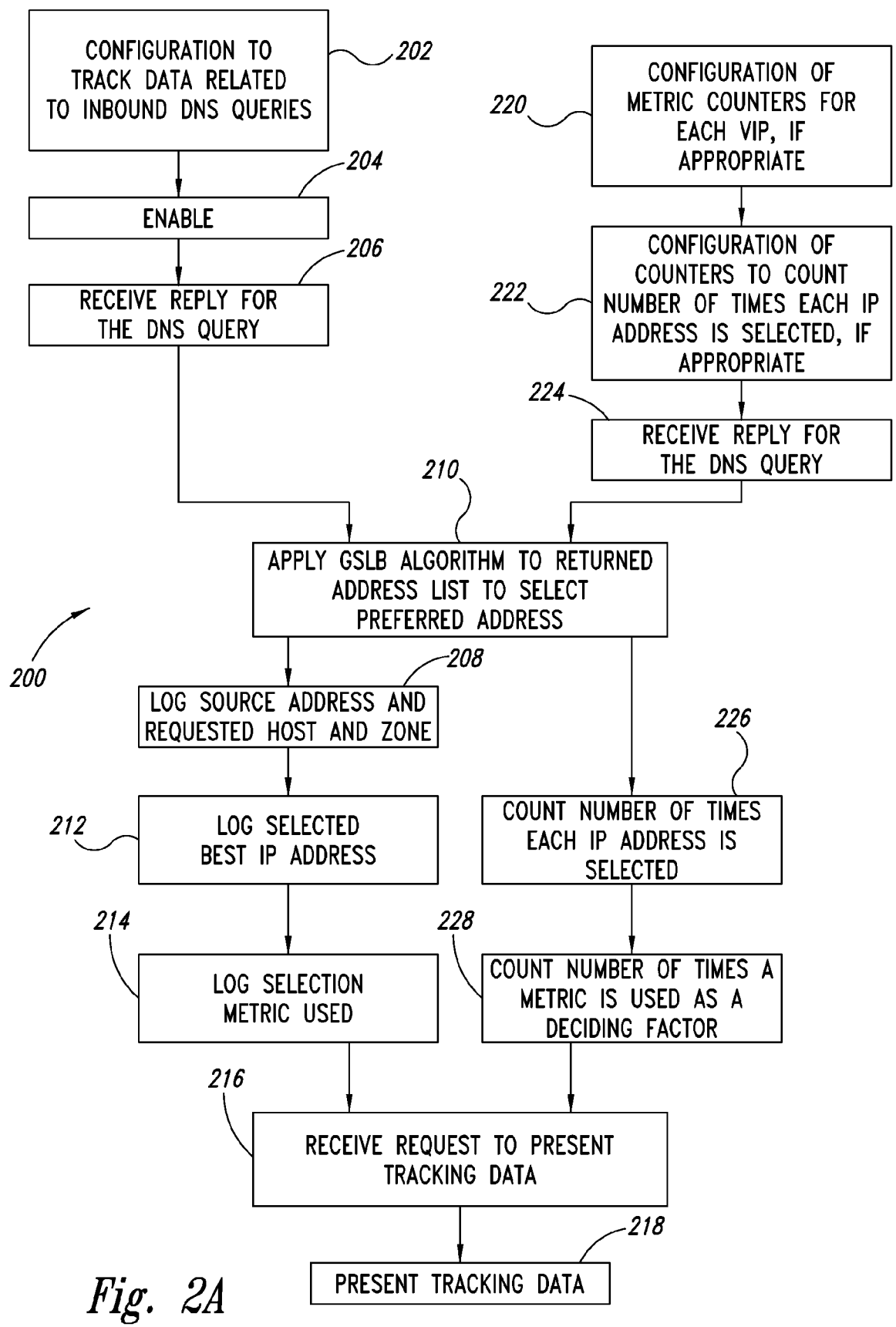
FIG. 2A illustrates in a flowchart one embodiment of a method for tracking data related to global server load balancing.

FIG. 2A illustrates in a flowchart 200 one embodiment of a method for tracking data related to global server load balancing. At least some of the elements of the flowchart 200 may be embodied in software or other machine-readable instructions stored on one or more machine-readable media. Such machine-readable media may be at the GSLB switch 12, at the syslog server 409, at sites 20 or 24, or at other locations or combinations thereof. The flowchart 200 shows two separate concurrent paths, one path for logging data related to inbound DNS queries and another path for counting metric data. It is appreciated that this depiction is for purposes of explanation and clarification, and that in some embodiments, there not need be two separate paths for these operations (e.g., they can be performed sequentially or concurrently within the "same path"). Moreover, the various operations need not necessarily occur in the exact order depicted and that some operations can be eliminated or combined.

Beginning first at a block 202, the GSLB switch 12 and the syslog server 409 are configured to track data related to inbound DNS queries, such as data identifying a source address and requested host and zone, which may be obtained from the reply to the query provided by the authoritative DNS server 16 in one embodiment. Such configuration can include, for instance, adding CLI enabling/disabling feature, identifying which (if not all) data to track, and setting parameters for the data to be tracked (e.g., setting the tracking to occur only during specific hours of certain days, for instance). As another example, it may be desired in some implementations to track the requested hosts and zones, but not necessarily the address of the source of the DNS request.

Once configuration is completed at the block 202, the tracking can be enabled at a block 204. This enablement may be performed by a system administrator via a CLI command in one embodiment described above. Thereafter, tracking data related to received replies to DNS queries at a block 206 can begin.

The DNS reply (to the original query) is received at the block 206 from the authoritative DNS server 16. When an IP address list is returned to the GSLB switch 12 from the authoritative DNS server 16 in the reply, the GSLB algorithm described above is applied to the address list at a block 210. An ordered list of IP addresses results, with the best IP address listed at the top.

The address of the requesting source and the requested host and zone are logged at the block 208 from the reply received from the authoritative DNS server 16. As previously described above, this operation can involve a parsing of the DNS reply by the DNS proxy module 403 in cooperation with the parser 411, followed by logging of the parsed information into the syslog server 409. The parsing of the DNS reply can be performed to find the client's subnet address, in one embodiment, since the reply is destined to the client's local DNS server 30.

Based on this ordered list of IP addresses, the selected best IP address is logged at a block 212. This operation at the block 212 may involve, for instance, parsing the best IP address from the top of the list and sending that IP address to the syslog server 409 for storage as part of the log data to be compiled into statistics. Additionally at a block 214, the particular metric used to select that IP address is logged.

When appropriate, a system administrator or other entity (including automated monitoring agents) sends a request for the tracking data at a block 216. This may be performed, for instance, by accessing the syslog server 409 to request the data stored therein. At a block 218, the requested tracking data is presented, such as via hardcopy computer printout or on a user interface screen.

With regards to the other path of the flowchart 200 related to counting metrics, configuration of the metric counters 410 occurs at a block 220 in implementations where per-metric counting capability can be enabled or disabled through a CLI. In other embodiments, this configuration is not performed. This configuration can involve, for example and in implementations where it is appropriate, assigning counters for each VIP address, correlating the counters to each metric, and so forth. Another possible configuration can involve enabling the counters for only a subset of all performance metrics for a particular VIP address and/or for every VIP address. Additional configuration, if appropriate, may be performed at a block 222 to provide for a count of the number of times each VIP is selected as the best address.

In a response to DNS queries at a block 224 (or at the block 206), lists of IP addresses are returned from the authoritative DNS server 16, and the GSLB algorithm is applied to the address lists at the block 210. At a block 226, the number of times each IP address (or VIP address) is selected is counted. At a block 228, the counters 410 count the number of times a metric is used as a deciding factor over other metrics, for each IP address (or VIP address). It is appreciated that operations related to the counting can be performed, including providing percentages in addition or alternatively to hard counts. The count data may then be requested and presented at blocks 216 and 218, respectively.

Figure 2B:
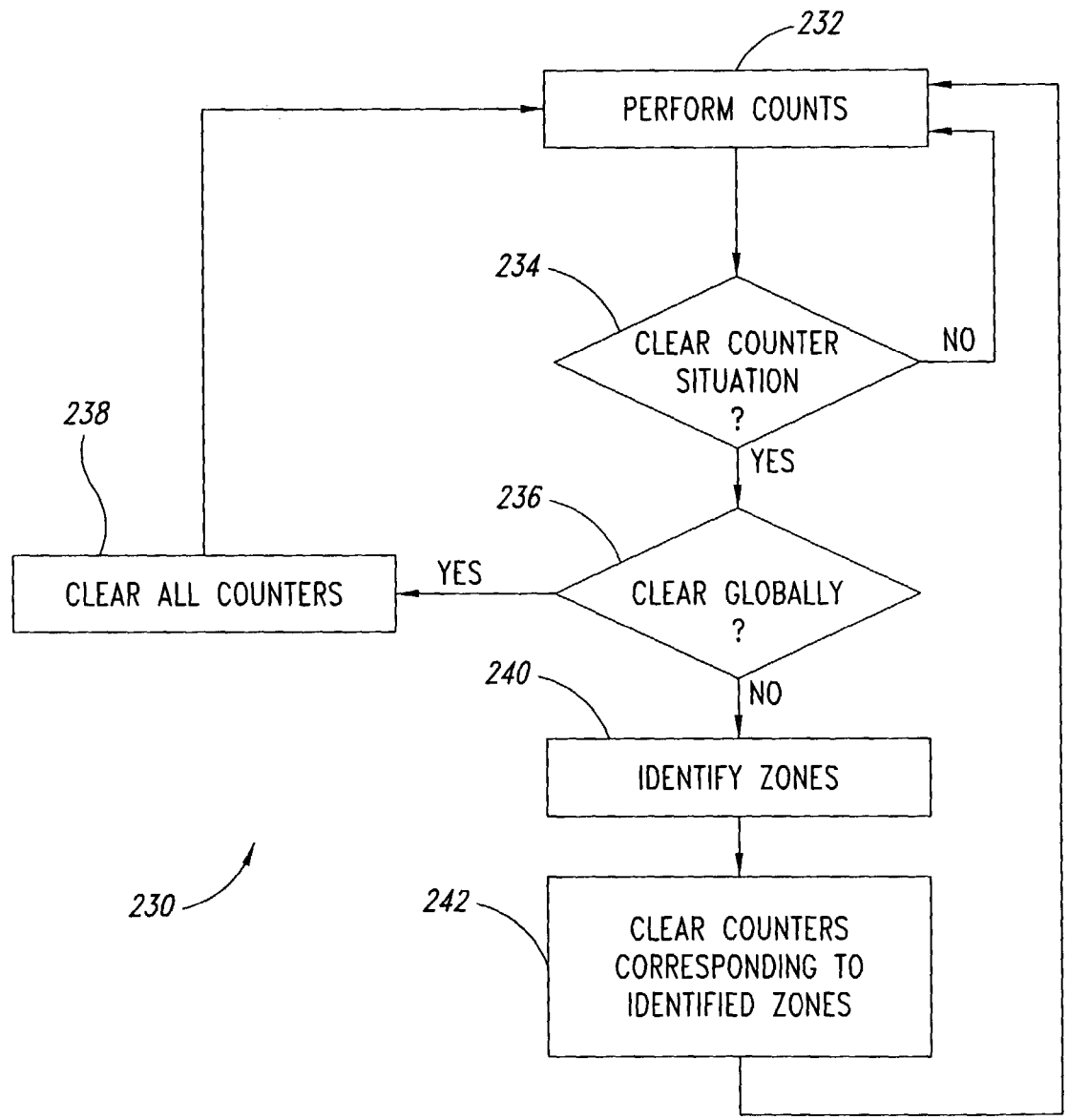
FIG. 2B illustrates in a flowchart one embodiment of a method for clearing counters that have tracked data in accordance with the method of FIG. 2A.

FIG. 2B illustrates in a flowchart 230 one embodiment of a method for clearing counters that have tracked data in accordance with the method of FIG. 2A. The counters 410 count the various GSLB operation-related data described above, such as each time an IP address is selected as the best address, each time a particular metric has been the deciding factor, and so forth at a block 232 (corresponding to blocks 226 or 228 of FIG. 2A).

A block 234 determines if a situation is present where one or more of the counters 410 need to be cleared. If such a situation is not present, then the counters 410 continue counting at the block 232. One example situation is when the system administrator would like to perform a clean start without having to take the GSLB switch 12 offline or otherwise reload. Another example is when the system administrator would like to test the GSLB implementation, such as by reordering the metrics in the algorithm or repeatedly testing each individual metric.

Yet another situation in the block 234 is when a particular IP address may have been down or otherwise offline for a period of time. Under the least response, weighted site, or weighted IP metric, this IP address may appear to be the best IP address since its corresponding selection counter would probably have the lowest counts relative to other selection counters. This can undesirably result in an inordinate amount of traffic being subsequently routed to that IP address. Therefore, the block 234 identifies such IP addresses that may have had a recent downtime and that may have low selection counts. IP addresses that may have been down can be identified from prior health checks, for instance in one embodiment. Such identification of recently down IP addresses from prior health check data can be performed by software or manually by a system administrator at the block 234. If such IP addresses are identified at the block 234, then its counter(s) and the counters for other IP addresses in the same zone should be cleared.

The extent of counter-clearing is determined at a block 236. To clear counters per zone, or globally for all zones, the following example CLI command can be used:

SLB-ServerIron# clear gslb dns zone [zone-name]

If the CLI command at the block 236 specifies globally clearing counters for all zones, then such counters are cleared at a block 238. According to one embodiment, clearing a counter involves resetting them to zero or other reference number. It is appreciated that other clearing techniques may be implemented, such as erasure of prior count data, overwriting prior count data, and so forth. After all the counters are cleared at the block 238, then new counts can be performed at the block 232. In the case where the counters were cleared because one or more IP addresses was recently down, the various IP addresses would be considered equal under the relevant metric after the clearing is completed, and therefore the GSLB algorithm would proceed to the next metric in the sequence to attempt to identify the best IP address.

If counters are not to be globally cleared for all zones at the block 236, then the specific zones for which counters are to be cleared are identified at a block 240. This zone identification can be obtained from the CLI command above, and can specify or select, as an example, the zone "abcd.com." This zone selection in the CLI command instructs that all selection counters corresponding to IP addresses for abcd.com be cleared. The clearing of these counters is performed at a block 242. After clearing is completed, the counters can again resume counting at the block 232.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention and can be made without deviating from the spirit and scope of the invention.

For example, while one embodiment has been described above where the counters 410 can comprise discrete hardware devices to count selection occurrences, it is appreciated that the counters 410 need not necessarily be embodied in this form. Software counters or other components in a software application or algorithm can operate to count selection occurrences (or other GSLB operation-related occurrences).

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for a load balance switch, the method comprising:
    determining if at least one counter of a plurality of counters in the load balance switch has data indicative of selection by said load balance switch of a preferred address among a plurality of addresses, said plurality of addresses respectively corresponding to said plurality of counters; and
    if it is determined that the at least one counter has the data, clearing all of said plurality of counters while maintaining existing communications to said plurality of addresses,
    wherein said preferred address is selected based on a set of performance metrics, and wherein said data in said at least one counter includes respective counts of how many times each performance metric from said set of performance metrics was used as a deciding factor in selecting said preferred address.

2. The method of claim 1, further comprising determining if at least one address of said plurality of addresses has been previously inaccessible, and wherein said clearing is performed to have said at least one address considered equally by a load balancing algorithm of said load balance switch with respect to other addresses in said plurality of addresses.

3. The method of claim 2 wherein said clearing, performed to have said at least one address considered equally by the load balancing algorithm with respect to other addresses in said plurality of addresses, prevents said at least one address from being flooded with traffic when said at least one address comes back online from being inaccessible.

4. The method of claim 1, further comprising determining if a start of the load balance switch is to be performed.

5. The method of claim 1, further comprising determining if a test of the load balance switch is to be performed.

6. The method of claim 1 wherein said clearing all of said plurality of counters includes setting a count of each of said plurality of counters to zero.

7. The method of claim 1 wherein said clearing all of said plurality of counters includes clearing said plurality of counters globally for all zones.

8. The method of claim 1 wherein said clearing all of said plurality of counters includes clearing said plurality of counters corresponding to addresses in only a selected individual zone that is configured to be load balanced by said load balance switch and not clearing globally for all zones that are configured to be load balanced by said load balance switch.

9. The method of claim 1 wherein said clearing all of said plurality of counters includes clearing at least one of said counters in response to a software command.

10. The method of claim 1 wherein the data indicative of selection of the preferred address is used by said load balance switch in connection with at least one metric usable to identify the preferred address.

11. The method of claim 1 wherein said addresses, among which said load balance switch selects said preferred address, include virtual IP addresses respectively configured at a plurality of site switches remote from said load balance switch, and wherein at least one host server is respectively bound to each of said virtual IP addresses.

12. An article of manufacture, comprising:
    a storage medium having instructions stored thereon that are executable by a load balance switch to:
    determine if at least one counter in the load balance switch has data, said at least one counter corresponding to an address; and
    clear the at least one counter, if the at least one counter is determined to have the data, such that existing communication to said address is maintained,
    wherein said data in said at least one counter includes respective counts of how many times each performance metric from a set of performance metrics was used as a deciding factor in selecting a preferred address.

13. The article of manufacture of claim 12 wherein the instructions to clear the at least one counter include instructions to clear a plurality of counters globally for all zones.

14. The article of manufacture of claim 12 wherein the instructions to clear the at least one counter include instructions to clear a plurality of counters for only a selected individual zone that is configured to be load balanced by said load balance switch and not clear globally for all zones that are configured to be load balanced by said load balance switch.

15. The article of manufacture of claim 12 wherein the instructions to clear the at least one counter include instructions to set a count of said at least one counter to zero.

16. The article of manufacture of claim 12 wherein said address is included amongst a plurality of addresses, said plurality of addresses respectively corresponding to a plurality of said at least one counter, and wherein the instructions to clear said at least one counter include instructions executable by said load balance switch to:
clear all of said plurality of counters while maintaining existing communications to said plurality of addresses.

17. The article of manufacture of claim 16 wherein the storage medium further includes instructions stored thereon that are executable by said load balance switch to:
determine if at least one address of said plurality of addresses has been previously inaccessible and if a particular counter corresponding to said at least one address indicates a low selection count,
wherein the instructions to clear all of said plurality of counters includes instructions to reset all of said plurality of counters to zero, including said corresponding particular counter, so as to have said at least one address considered equally by a load balancing algorithm of said load balance switch with respect to other addresses in said plurality of addresses, when said at least one address comes back online.

18. The article of manufacture of claim 17 wherein said instructions to reset all of said plurality of counters to zero, so as to have said at least one address considered equally by the load balancing algorithm with respect to other addresses in said plurality of addresses, prevents said at least one address from being flooded with traffic when said at least one address comes back online from being inaccessible.

19. A load balance switch, comprising:
at least one hardware counter corresponding to an address; and
a means for determining if said at least one counter has data, and for clearing the at least one counter, if the at least one counter is determined to have the data, such that existing communication to said address is maintained,
wherein said data in said at least one counter includes respective counts of how many times each performance metric from a set of performance metrics was used as a deciding factor in selecting a preferred address.

20. The load balance switch of claim 19 wherein the means for clearing the at least one counter clears a plurality of counters globally for all zones.

21. The load balance switch of claim 19 wherein the means for clearing the at least one counter clears a plurality counters for only a selected individual zone that is configured to be load balanced by said load balance switch and does not clear globally for all zones that are configured to be load balanced by said load balance switch.

22. The load balance switch of claim 19 wherein said address is included amongst a plurality of addresses, said plurality of addresses respectively corresponding to a plurality of counters, and wherein said means for clearing clears all of said plurality of counters, if said at least one counter is determined to have the data, such that existing communications to said plurality of addresses is maintained.

23. A load balance switch, comprising:
at least one data repository to store count data corresponding to an address;
a controller coupled to the data repository to control storage of the data in the at least one data repository; and
a component responsive to the controller to clear the at least one data repository of said stored count data such that existing communication to said address is maintained,
wherein said data stored in said at least one data repository includes respective counts of how many times each performance metric from a set of performance metrics was used as a deciding factor in selecting a referred address.

24. The load balance switch of claim 23 wherein the at least one data repository comprises a counter to count each time an address is selected as a preferred address.

25. The load balance switch of claim 24 wherein the at least one data repository further includes software.

26. The load balance switch of claim 23 wherein the component to clear the at least one data repository uses a software command.

27. The load balance switch of claim 23 wherein the component to clear the at least one data repository globally clears all said count data corresponding to all zones.

28. The load balance switch of claim 23 wherein the component to clear the at least one data repository clears all said count data corresponding to only a selected one of a plurality of zones that is configured to be load balanced by said load balance switch and not clear globally for all zones that are configured to be load balanced by said load balance switch.

29. The load balance switch of claim 23 wherein the component to clear the at least one data repository clears all said count data corresponding to a plurality of addresses if at least one address of the plurality of addresses was previously inaccessible, so that said at least one address is considered equally by said controller with respect to other addresses in said plurality.

30. The load balance switch of claim 24 wherein clearance of the at least one data repository, by said component to have said at least one address considered equally by said controller with respect to other addresses in said plurality, prevents said at least one address from being flooded with traffic when said at least one address comes back online from being inaccessible.

31. The load balance switch of claim 23 wherein the component to clear the at least one data repository clears all said count data in the at least one data repository if at least one of a load balance start, a metric reorder, and a metric test is to be performed by the controller.

32. The load balance switch of claim 23 wherein said address is included amongst a plurality of addresses, said plurality of addresses respectively corresponding to a plurality of said at least one data repository, and wherein said component is adapted to clear all of said plurality of data repositories such that existing communications to said plurality of addresses is maintained.

* * * * *

UNITED STATES PATENT AND TRADEMARK OFFICE
CERTIFICATE OF CORRECTION

PATENT NO. : 7,676,576 B1
APPLICATION NO. : 10/377364
DATED : March 9, 2010
INVENTOR(S) : Kommula It is certified that error appears in the above-identified patent and that said Letters Patent is hereby corrected as shown below:

Column 16, line 13, "selecting a referred address." should read --selecting a preferred address.--.
Column 16, line 38, "switch of claim 24 wherein" should read --switch of claim 29 wherein--.

Signed and Sealed this

Seventeenth Day of August, 2010

David J. Kappos
*Director of the United States Patent and Trademark Office*